United States Patent
Shioya et al.

(10) Patent No.: US 9,104,059 B2
(45) Date of Patent: Aug. 11, 2015

(54) IMAGE DISPLAY DEVICE AND LIGHT SOURCE COOLING METHOD

(75) Inventors: Yukinori Shioya, Tokyo (JP); Jiro Takami, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 268 days.

(21) Appl. No.: 13/813,638

(22) PCT Filed: Aug. 24, 2010

(86) PCT No.: PCT/JP2010/064234
§ 371 (c)(1),
(2), (4) Date: Jan. 31, 2013

(87) PCT Pub. No.: WO2012/025986
PCT Pub. Date: Mar. 1, 2012

(65) Prior Publication Data
US 2013/0128457 A1    May 23, 2013

(51) Int. Cl.
G03B 21/16    (2006.01)
G02F 1/1333   (2006.01)
G03B 21/20    (2006.01)

(52) U.S. Cl.
CPC .......... *G02F 1/133385* (2013.01); *G03B 21/16* (2013.01); *G03B 21/2026* (2013.01)

(58) Field of Classification Search
USPC ....................................... 353/52, 57, 58, 121
See application file for complete search history.

(56) References Cited

U.S. PATENT DOCUMENTS 7,088,058 B2 *   8/2006  Shiota et al. ................. 315/291
7,131,731 B2 *  11/2006  Oketani ........................ 353/57
8,050,449 B2 *  11/2011  Kim ............................. 382/100
8,419,193 B2 *   4/2013  Kuo et al. .................... 353/85
2002/0005916 A1 *  1/2002  Sawai et al. .................. 348/748
2005/0030485 A1   2/2005  Oketani
2006/0065125 A1   3/2006  Horiguchi et al.
2009/0033879 A1 *  2/2009  Saito ............................. 353/52

(Continued)

FOREIGN PATENT DOCUMENTS

CN    1447594 A    10/2003
CN    1755513 A    4/2006

(Continued)

OTHER PUBLICATIONS

International Search Report in PCT/JP2010/064234 dated Sep. 21, 2010(English Translation Thereof).

(Continued)

*Primary Examiner* — William C Dowling
(74) *Attorney, Agent, or Firm* — McGinn IP Law Group

(57) ABSTRACT

An image determination section determines whether an input image signal represents a bright image or a dark image. A control section switches between a first lighting mode in which the output of a power supply section is a first power value and a second lighting mode in which the output of power supply section is a second power value based on the determined result of the image determination section. The control section refers to a first table that contains data representing the relationship between the power value of the power supply section and the number of rotations of a cooling fan in the case in which the output of the power supply section is increased from the second power value to the first power value at a constant rate when the second lighting mode is switched to the first lighting mode.

12 Claims, 7 Drawing Sheets

(56) References Cited

U.S. PATENT DOCUMENTS

| | | |
|---|---|---|
| 2010/0026965 A1 | 2/2010 | Namba et al. |
| 2010/0164383 A1 | 7/2010 | Munters et al. |
| 2013/0128458 A1* | 5/2013 | Shioya et al. ................. 361/695 |

FOREIGN PATENT DOCUMENTS

| | | |
|---|---|---|
| JP | 2003-295320 A | 10/2003 |
| JP | 2004-361462 A | 12/2004 |
| JP | 2005-182087 A | 7/2005 |
| JP | 2006-030645 A | 2/2006 |
| JP | 2010-500730 A | 1/2010 |
| JP | 2010-032944 A | 2/2010 |
| WO | WO 2008/020366 A2 | 2/2008 |

OTHER PUBLICATIONS

Chinese Office Action dated Aug. 20, 2014 with an English translation thereof.

* cited by examiner

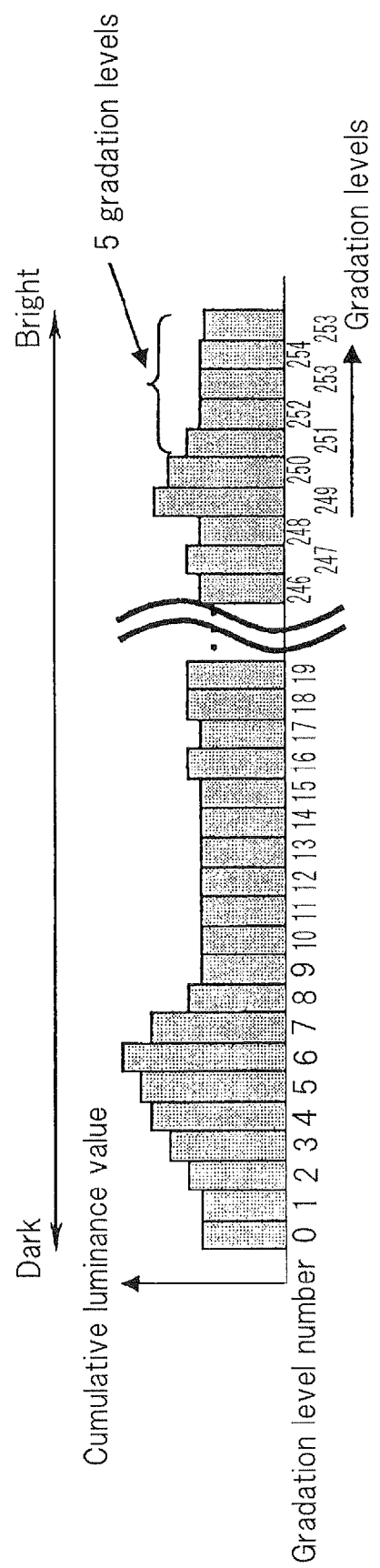

IMAGE DISPLAY DEVICE AND LIGHT SOURCE COOLING METHOD

TECHNICAL FIELD

The present invention relates to an image display device having a high pressure mercury lamp or the like as a light source.

BACKGROUND ART

An image display device such as a liquid crystal display or a projector is provided with a high pressure mercury lamp or the like as a light source. A high pressure mercury lamp is structured such that mercury or gas is confined in a glass tube. Thus, if the temperature of the lamp excessively rises, the glass tube will explode or quartz that makes up the glass tube will deform and thereby its permeability will deteriorate. To prevent such situations, image display devices that use a high pressure mercury lamp as a light source are generally provided with a cooling fan that cools the light source.

Some recent projectors that have a high pressure mercury lamp as a light source are provided with an energy saving mode that allows power supplied to the light source to be decreased to around several ten % of the maximum power (for example, around 75% to 80%). The energy saving mode might be set up, for example, by pressing a particular button mounted on the projector.

Generally, as power supplied to the light source decreases, the temperature of the light source becomes lower. Since the energy saving mode can decrease power supplied to the power source compared to the regular mode that causes the light source to be lighted at the maximum power, the energy saving mode can prevent a rise in the temperature of the light source and thereby can prolong the life of the light source.

However, projectors that are provided with the foregoing energy saving mode have the following problems.

It is known that when the temperature of a high pressure mercury lamp or the like as a light source excessively becomes low, mercury adheres to the inner surface of the glass tube, this phenomenon is known as the photo-darkening phenomenon.

In the energy saving mode, the temperature of the light source does not excessively rise compared to the regular mode. Thus, if the light source is cooled by a cooling fan in the same manner as in the regular mode, since the light source is excessively cooled, the photo-darkening phenomenon will occur.

Thus, if the energy saving mode is set up, it is necessary to decrease the amount of airflow of the cooling fan so as to prevent the occurrence of the photo-darkening phenomenon.

Patent Literature 1 discloses a technique that takes into consideration the temperature changes that occur in the light source when the light source is in the energy saving mode.

A projection type display device described in Patent Literature 1 has a light source, a sirocco fan, and a duct that guides cooling air generated by the sirocco fan to the light source. A control plate that controls the amount of airflow is rotatably supported in the duct so as to adjust the amount of airflow. When the angle of the airflow amount control plate changes, the area of the opening of the duct changes. As a result, the amount of airflow that flows in the duct increases or decreases. A control plate that controls the amount of airflow is rotated in association with a slide switch. The user can adjust the angle of control plate that controls the amount of airflow by using the slide switch.

When the power saving mode (corresponding to the foregoing energy saving mode) has been set up in the foregoing projection type display device, the user can operate the slide switch so as to decrease the amount of airflow supplied from the sirocco fan to the light source through the duct. Thus, excessive cooling of the light source can be prevented.

RELATED ART LITERATURE

Patent Literature

Patent Literature 1: JP2005-182087A, Publication

SUMMARY OF THE INVENTION

If an image signal represents a dark image compared to a bright image, the brightness of the image that appears in a case which power supplied to the light source is decreased, does not cause the user to feel uncomfortable. Thus, when it is determined as to whether the image signal represents a bright image or a dark image and then the normal mode is switched to the power saving mode or vice versa depending on the determined result, the life of the light source could be further prolonged.

However, in the projection type display device described in Patent Literature 1, since the user adjusts the amount of airflow by using the slide switch, when the mode is switched to another mode depending on the determined result, the following problems can arise.

If power supplied to the light source is suddenly increased or decreased, since the brightness of the screen (luminous intensity of the screen) suddenly changes, the brightness of the screen will cause the user to feel uncomfortable. To prevent the user from feeling uncomfortable, power is controlled such that when the energy saving mode is switched to the regular mode, power supplied to the light source is increased at a constant rate and when the regular mode is switched to the energy saving mode, power supplied to the light source is decreased at a constant rate.

In addition, the amount of airflow supplied from the cooling fan (sirocco fan) to the light source needs to be adjusted depending on the switching mode. Specifically, when the energy saving mode is switched to the regular mode, the amount of airflow needs to be increased. When the regular mode is switched to the energy saving mode, the amount of airflow needs to be decreased. However, it is very bothersome for the user to adjust the amount of airflow depending on the switching mode by using the slide switch.

However, it is difficult to finely adjust the amount of airflow, based on whether the power increases or decreases according to the switching mode, such that the temperature of the light source lies in the optimum temperature range. Thus, when the mode is switched, the temperature of the light source deviates from the optimum temperature range. As a result, as described above, explosion of glass tube, deterioration of permeability, and photo-darkening phenomenon will occur.

An object of the present invention is to provide an image display device and a light source cooling method that can adjust the amount of airflow and prevent the occurrence of explosion of glass tube, deterioration of permeability, and photo-darkening phenomenon when the mode is switched without user's intervention.

An image display device according to the present invention is an image display device that has a light source and that displays an image composed of a plurality of pixels obtained by spatially modulating light emitted from said light source corresponding to an input image signal, including:
a power supply section that supplies power to said light source;
a cooling fan that cools said light source;
a drive section that drives said cooling fan;
an image determination section that determines whether said input image signal represents a bright image or a dark image based on luminance values of the pixels of said image supplied as said input image signal; and
a control section that controls said drive section to drive said cooling fan and said power supply section to supply power to said light source,
wherein if said image determination section determines that said input image signal represents a bright image, said control section sets up a first lighting mode in which the output of said power supply portion is a first power value and if said image determination section determines that said input image signal represents a dark image, said control section sets up a second lighting mode in which the output of said power supply section is a second power value that is less than said first power value,
wherein said control section stores a first table that contains data representing the relationship between the power value of said power supply section and the number of rotations of said cooling fan in the case in which the output of said power supply section is increased from said second power value to said first power value at a constant rate and when said second lighting mode is switched to said first lighting mode, said control section increases the output of said power supply section to said first power value at a constant rate and controls the rotation of said cooling fan corresponding to the power value, of said power supply section with reference to said first table, and
wherein said control section stores a second table that contains data representing the relationship between the power value of said power supply section and the number of rotations of said cooling fan in the case in which the output of said power supply section is decreased from said first power value to said second power value at a constant rate and when said first lighting mode is switched to said second lighting mode, said control section decreases the output of said power supply section to said second power value at a constant rate and controls the rotation of said cooling fan corresponding to the power value of said power supply section with reference to said second table.

A light source cooling method according to the present invention is a light source cooling method for an image display device that has a light source, a power supply section that supplies power to said light source, and a cooling fan that cools said light source, said image display device displaying an image composed of a plurality of pixels obtained by spatially modulating light emitted from said light source corresponding to an input image signal, said light source cooling method comprising:
determining whether or not said input image signal represents a bright image or a dark image based on luminance values of the pixels of said image supplied as said input image signal;
switching between a first lighting mode in which the output of said power supply portion is a first power value and a second lighting mode in which the output of said power supply section is a second power value that is less than said first power value,
increasing the output of said power supply section to said first power value at a constant rate and controlling the rotation of said cooling fan corresponding to the power value of said power supply section with reference to a first table that contains data representing the relationship between the power value of said power supply section and the number of rotations of said cooling fan in the case in which the output of said power supply section is increased from said second power value to said first power value at a constant rate when said second lighting mode is switched to said first lighting mode; and
decreasing the output of said power supply section to said second power value at a constant rate and controlling the rotation of said cooling fan corresponding to the power value of said power supply section with reference to a second table that contains data representing the relationship between the power value of said power supply section and the number of rotations of said cooling fan in the case in which the output of said power supply section is decreased from said first power value to said second power value at a constant rate when said first lighting mode is switched to said second lighting mode.

BRIEF DESCRIPTION OF DRAWINGS

FIG. 8 is a schematic diagram exemplifying a histogram of image data having 256 gradation levels.

DESCRIPTION OF REFERENCE NUMERALS

Figure 1:
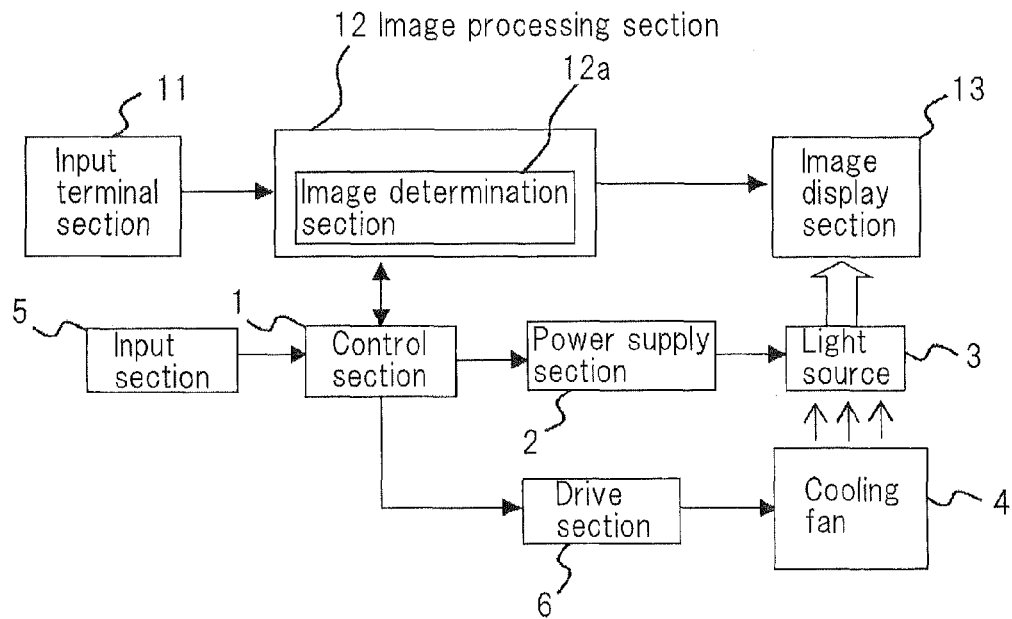
FIG. 1 is a block diagram showing the structure of an image display device according to a first embodiment of the present invention.

1 Control section
2 Power supply section
3 Light source
4 Cooling fan
5 Input section
6 Drive section
11 Input terminal section
12 Image processing section
12a Image determination section
13 Image display section

BEST MODES THAT CARRY OUT THE INVENTION

Next, with reference to the accompanying drawings, embodiments of the present invention will be described.

First Embodiment

FIG. 1 is a block diagram showing the structure of an image display device according to a first embodiment of the present invention.

Referring to FIG. 1, the image display device has control section 1, power supply section 2, light source 3, cooling fan 4, input section 5, drive section 6, input terminal section 11, image processing section 12, and image display section 13.

Light source 3 is a high pressure mercury lamp or the like. Power supply section 2 supplies power to light source 3. Cooling fan 4 cools light source 3. Drive section 6 drives cooling fan 4. Specifically, drive section 6 supplies a voltage to cooling fan 4.

Image display section 13 has a display element with which light emitted from light source 3 is irradiated; and a projection section that projects an image generated by the display element. The display element is for example a liquid crystal panel or a DMD.

An image signal is supplied from an external image supply unit to image processing section 12 through input terminal section 11. The external image supply unit is, for example, an information processing unit such as a personal computer.

Image processing section 12 performs a process that image display section 13 needs to perform to display an image corresponding to an image signal supplied from input terminal section 11. Image processing section 12 has image determination section 12a that determines whether the image signal supplied through input terminal section 11 represents a bright image or a dark image based on the luminance values of individual pixels of the display element. Image determination section 12a performs the determination frame by frame and supplies the determined result to control section 1.

In this context, a dark image denotes that the ratio of the high gradation level portions (for example, 251st to 255th gradation level portions of a histogram of an image having 256 gradation levels) and the entire image is equal to or less than a predetermined threshold (for example, 2% or less). By contrast, a bright image denotes that the ratio exceeds the threshold. Alternatively, a dark image might denote that the APL (average picture level) of an image is equal to or less than a predetermined threshold, whereas a bright image might denote that the APL of the image is greater than the threshold.

Input section 5 has a plurality of buttons. The user can set up an automatic energy saving mode by inputting a predetermined one or a plurality of these buttons.

In the automatic energy saving mode, the image display device automatically switches between a first lighting mode (for example, a regular mode) in which the output of power supply section 2 is a first power value and a second lighting mode (for example, an energy saving mode) in which the output of power supply section 2 is a second power value that is smaller than the first power value. The first power value is for example the maximum power value. The second power value is smaller than the maximum power value, for example, a value of around 75% of the maximum power.

When input section 5 accepts an input that designates the automatic energy saving mode, input section 5 outputs a command signal that represents the designation of the automatic energy saving mode. When input section accepts an input that cancels the automatic energy saving mode, input section 5 outputs a command signal that represents the cancellation of the automatic energy saving mode.

Control section 1 controls drive section 6 to drive cooling fan 4 and power supply section 2 to supply power to light source 3.

In the automatic energy saving mode, if image determination section 12a determines that the image signal represents a bright image, control section 1 sets up the first lighting mode; if image determination section 12a determines that the image signal represents a dark image, control section 1 sets up the second lighting mode.

Control section 1 stores a first table that contains data representing the relationship between the power value of power supply section 2 and the number of rotations of cooling fan 4 in the case in which the output of power supply section 2 increases from the second power value to the first power value at a constant rate. When the second lighting mode is switched to the first lighting mode, control section 1 increases the output of power supply section 2 to the first power value at a constant rate and controls the rotation of cooling fan 4 corresponding to the power value of power supply section 2 with reference to the first table.

In addition, control section 1 stores a second table that contains data representing the relationship between the power value of power supply section 2 and the number of rotations of cooling fan 4 in the case in which the output of power supply section 2 decreases from the first power value to the second power value at a constant rate. When the first lighting mode is switched to the second lighting mode, control section 1 decreases the output of power supply section 2 to the second power value at a constant rate and controls the rotation of cooling fan 4 corresponding to the power value of power supply section 2 with reference to the second table.

Next, a light source cooling method that the image display device, according to this embodiment, performs will be described.

Figure 2:
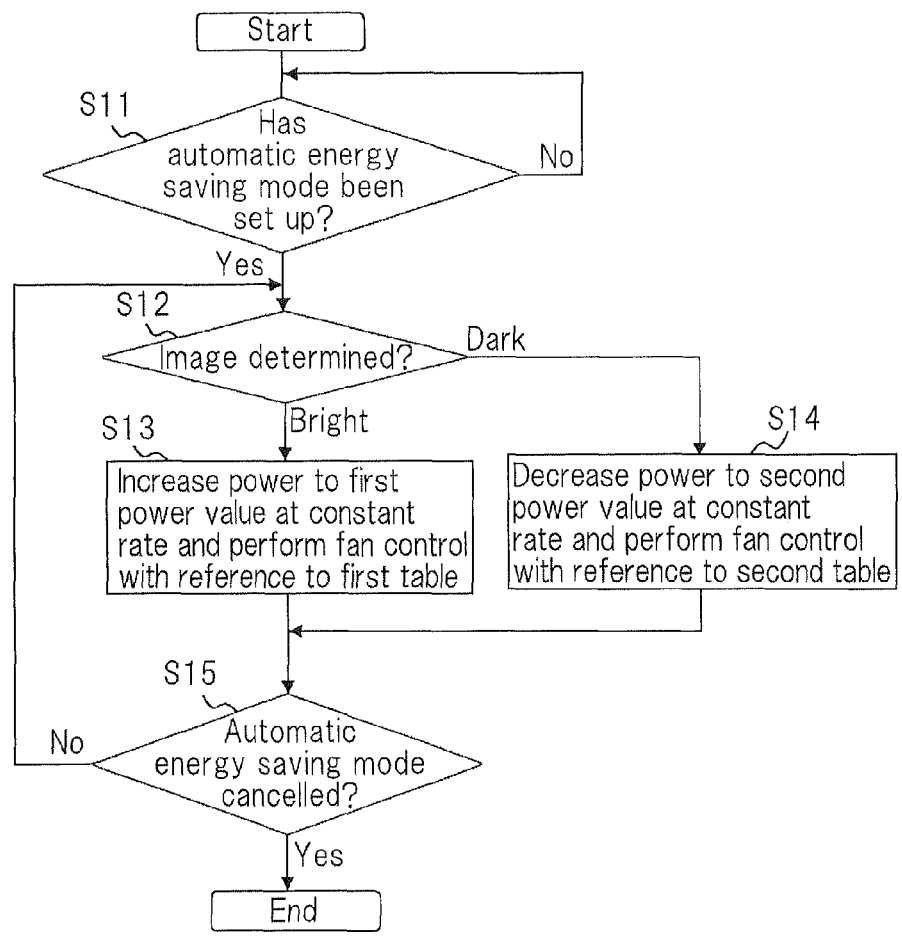
FIG. 2 is a flow chart showing a procedure of lamp/fan that controls the image display device shown in FIG. 1 performs.

FIG. 2 is a flow chart showing a procedure of lamp/fan controls that the image display device, according to this embodiment, performs.

First, control section 1 determines whether or not it has accepted a command signal that represents the designation of the automatic energy saving mode from input section 5 (at step S11).

When control section 1 accepts the command signal that represents the designation of the automatic energy saving mode from input section 5, control section 1 receives the determined result that denotes that the image signal represents a dark image or a bright image from image determination section 12a (at step S12).

If control section 1 receives the determined result that denotes that the image signal represents a bright image from image determination section 12a, control section 1 increases the output of power supply section 2 to the first power value at a constant rate and controls the rotation of cooling fan 4 corresponding to the power value of power supply section 2 with reference to the first table (at step S13). After step S13, the mode is switched to the first lighting mode.

If control section 1 receives the determined result that denotes that the image signal represents a dark image from image determination section 12a, control section 1 decreases the output of power supply section 2 to the second power value at a constant rate and controls the rotation of cooling fan 4 corresponding to the power value of power supply section 2 with reference to the second table (at step S14). After step S14, the mode is switched to the second lighting mode.

After step S13 or S14, control section 1 determines whether or not it has accepted the command signal that represents the cancellation of the automatic energy saving mode from input section 5 (at step S15). Control section 1 iteratively executes step S12 to S14 until it receives the command signal that represents the cancellation of the automatic energy saving mode.

In the foregoing lamp/fan controls, the mode is automatically switched to the first lighting mode or the second lighting mode corresponding to the determined result that denotes that the image signal represents a bright image or a dark image.

When the first lighting mode is switched to the second lighting mode, the fan control is performed with reference to the second table. Thus, the temperature of light source 3 is maintained in a predetermined temperature range. In contrast, when the second lighting mode is switched to the first lighting mode, the fan control is performed with reference to the first table. Thus, the temperature of light source 3 is maintained in a predetermined temperature range.

When the mode is switched to another mode, since the fan control is automatically performed with reference to the first or second table, the amount of airflow can be adjusted without user's intervention.

Moreover, in the fan control performed with reference to the first or second table, when one mode is switched to another mode, since the temperature of light source 3 can be maintained in the predetermined temperature range, explosion of glass tube, deterioration of permeability, and photodarkening phenomenon can be prevented.

If power supplied to the light source is suddenly increased or decreased, since the brightness of the screen (luminous intensity of screen) suddenly changes, the brightness of the screen will cause the user to feel uncomfortable. Thus, according to this embodiment, when the mode is switched to another mode, since power supplied to light source 3 is increased or decreased at a constant rate, such uncomfortableness can be prevented.

In addition, in the automatic energy saving mode, if the image signal represents a dark image, when light source 3 is lighted in the second lighting mode (energy saving mode), the life of the light source can be prolonged.

Although the screen that appears in the second lighting mode is darker than the screen that appears in the first lighting mode, if the difference between the first power value and the second power value is small, the user will be able to see the image without brightness of the screen causing the user to experience any feeling of discomfort.

If the difference between the first power value and the second power value is large, the brightness of the screen may cause the user to feel uncomfortable. In this case, such uncomfortableness could be prevented, for example, by a process that increases the contrast (increase the amplitude of the image signal).

Specifically, if image determination section 12a determines that the image signal represents a bright image, control section 1 increases the output of power supply section 2 to the first power value. When the output of power supply section 2 becomes the first power value, control section 1 supplies a mode switch signal that denotes that the second lighting mode has been switched to the first lighting mode to image processing section 12. When image processing section 12 receives the mode switch signal from control section 1, image processing section 12 decreases the amplitude of the image signal received from input terminal section 11 to a first amplitude value.

If image determination section 12a determines that the image signal represents a dark image, control section 1 decreases the output of power supply section 2 to the second power value. When the output of power supply section 2 becomes the second power value, control section 1 supplies a mode switch signal that denotes that the first lighting mode has been switched to the second lighting mode to image processing section 12. When image processing section 12 receives the mode switch signal from control section 1, image processing section 12 increases the amplitude of the image signal received from input terminal section 11 to a second amplitude value. In this example, the second amplitude value is greater than the first amplitude value.

Alternatively, in the image display device according to this embodiment, control section 1 may store the first setup value that is set up in the first lighting mode as the number of rotations of cooling fan 4 and performs the fan control with reference to the first table such that before the output of power supply section 2 becomes the first power value, control section 1 increases the number of rotations of cooling fan 4 to a number of rotations that is greater than the first setup value at a constant rate and then decreases the number of rotations of cooling fan 4 to the number of rotations corresponding to the first setup value at a constant rate.

In addition, control section 1 may store the number of rotations of cooling fan 4 that is set up in the second lighting mode as a second setup value that is less than the first setup value and perform fan control with reference to the second table such that before the output of power supply section 2 becomes the second power value. Control section 1 decreases the number of rotations of cooling fan 4 to the number of rotation that is equal to or less than the second setup value at a constant rate.

When the second lighting mode is switched to the first lighting mode, before the output of power supply section 2 becomes the first power value, if image determination section 12a determines that the image signal represents a dark image, after the output of power supply section 2 becomes the first power value and the number of rotations of cooling fan 4 becomes the number of rotations corresponding to the first setup value, control section 1 may decrease the output of power supply section 2 to the second power value at a constant rate and perform fan control with reference to the second table.

When the first lighting mode is switched to the second lighting mode, before the output of power supply section 2 becomes the second power value, if image determination section 12a determines that the image signal represents a bright image, control section 1 may increase the output of power supply section 2 to the first power value at a constant rate and perform fan control with reference to the first table.

The constant rate by which the output of power supply section 2 is increased in the case in which the second lighting mode is switched to the first lighting mode may be equal to or greater than the constant rate by which the output of power supply section 2 is decreased in the case in which the first lighting mode is switched to the second lighting mode.

Second Embodiment

Figure 3:
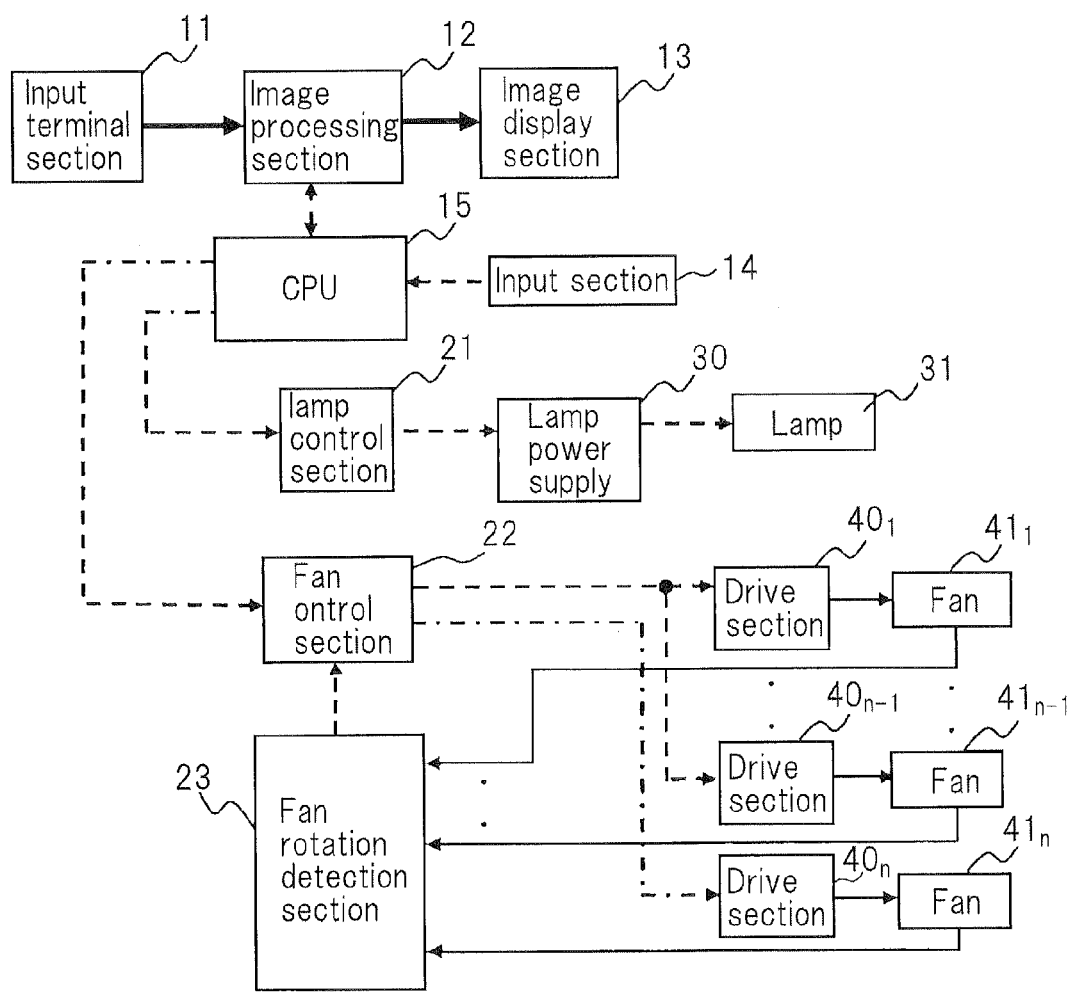
FIG. 3 is a block diagram showing the structure of an image display device according to a second embodiment of the present invention.

FIG. 3 is a block diagram showing the structure of an image display device according to a second embodiment of the present invention.

Referring to FIG. 3, the image display device has input terminal section 11, image processing section 12, image display section 13, input section 14, CPU (Central Processing Unit) 15, lamp control section 21, fan control section 22, fan rotation detection section 23, lamp power supply 30, lamp 31, drive sections $40_1$ to $40_n$, and fans $41_1$ to $41_n$.

Input terminal section 11, image processing section 12, and image display section 13 are the same as those shown in FIG.

1. Image display section 13 includes image determination section 12a shown in FIG. 1. According to this embodiment, image determination section 12a creates a histogram that represents a distribution of luminance values of individual pixels of an image signal frame by frame (a histogram of an image having 256 gradation levels). If the ratio of high gradation level portions (251st to 255th gradation level portions) and the entire image is equal to or less than a predetermined threshold (for example 2% or less), image determination section 12a determines that the image signal represents a dark image. If the ratio exceeds the threshold, image determination section 12a determines that the image signal represents a bright image. The determined result is supplied to CPU 15. In this example, the threshold can be appropriately designated.

Lamp 31 is a high pressure mercury lamp or the like. Lamp power supply 30 supplies power to lamp 31. Lamp control section 21 controls lamp power supply 30 to supply power to lamp 31 corresponding to a lamp control signal that is output from CPU 15. Specifically, lamp control section 21 outputs an ON/OFF signal that is a power supply control signal and a power designation signal that represents a power value.

Fans $41_1$ to $41_n$ each change the number of rotations corresponding to the input voltage and output a rotation signal that represents the number of rotations. Fan $41_n$ cools lamp 31. Remaining fans $41_1$ to $41_{n-1}$ are, for example, an air exhaust fan, an air intake fan, and so forth. The air exhaust fan and air intake fan are mounted on an enclosure that accommodates image processing section 12, image display section 13, CPU 15, lamp control section 21, fan control section 22, fan rotation detection section 23, lamp power supply 30, lamp 31, drive sections $40_1$ to $40_n$, and so forth.

Drive sections $40_1$ to $40_n$ are provided corresponding to fans $41_1$ to $41_n$. Drive sections $40_1$ to $40_{n-1}$ supply voltages to fans $41_1$ to $41_{n-1}$, respectively, corresponding to a first voltage control signal that is output from fan control section 22. Drive section $40_n$ supplies a voltage to fan $41_n$, corresponding to a second voltage control signal that is output from fan control section 22. In other words, a control system for fans $41_1$ to $41_{n-1}$ is independent from that for fan $41_n$.

Fan control section 22 supplies the first voltage control signal to each of drive sections $40_1$ to $40_{n-1}$ and the second voltage control signal to drive section $40_n$ corresponding to a fan control signal that is output from CPU 15.

The rotation signals that are output from fans $41_1$ to $41_n$ are supplied to fan rotation detection section 23. Fan rotation detection section 23 detects the numbers of rotations of fans $41_1$ to $41_n$ corresponding to the rotation signals that are output therefrom and supplies the detected results to fan control section 22.

Fan control section 22 increases or decreases the output of drive section $40_n$ such that the number of rotations of fan $41_n$ that is supplied from fan rotation detection section 23 becomes the number of rotations corresponding to the fan control signal that is output from CPU 15.

In addition, fan control section 22 increases or decreases the outputs of drive sections $40_1$ to $40_{n-1}$ such that the average value of the numbers of rotations of fans $41_1$ to $41_{n-1}$ or the number of rotations of any one of fans $41_1$ to $41_{n-1}$ becomes the number of rotations corresponding to the fan control signal that is output from CPU 15.

Although the numbers of rotations of fans $41_1$ to $41_{n-1}$ are uniformly controlled, the number of rotations of fan $41_n$ is controlled independent from those of fans $41_1$ to $41_{n-1}$.

Input section 14 has a plurality of buttons. The user can set up the foregoing automatic energy saving mode by inputting a predetermined button or a plurality of these buttons. When input section 14 accepts an input that designates the automatic energy saving mode, input section 14 outputs a command signal that represents the designation of the automatic energy saving mode. When input section 14 accepts an input that cancels the automatic energy saving mode, input section 14 outputs a command signal that represents the cancellation of the automatic energy saving mode.

In this example, the automatic energy saving mode is a mode in which a 75% lighting mode is automatically switched to a regular mode or vice versa. In the regular mode, the output of lamp power supply 30 is the first power value. In the 75% lighting mode, the output of lamp power supply 30 is the second power value. The first power value is the maximum power value, whereas the second power value is a power value of 75% of the maximum power.

CPU 15 controls drive sections $40_1$ to $40_n$ to supply voltages to fans $41_1$ to $41_n$ through fan control section 22 and lamp power supply 30 to supply power to lamp 31 through lamp control section 22 corresponding to the command signal that is output from input section 14.

When CPU 15 accepts a command signal that represents the designation of the automatic energy saving mode from input section 14, CPU 15 causes lamp control section 21 and fan control section 22 to execute the lamp/fan controls as shown in FIG. 2.

Specifically, CPU 15 stores a first table that contains data representing the relationship between the power value of lamp power supply 30 and the number of rotations of fan $41_n$ in the case in which the output of lamp power supply 30 increases from a second power value (75%) to a first power value (maximum power value) at a constant rate. In addition, CPU 15 stores a second table that contains data representing the relationship between the power value of lamp power supply 30 and the number of rotations of fan $41_n$ in the case in which the output of lamp power supply 30 decreases from the first power value (maximum power value) to the second power value (75%) at a constant rate.

In the automatic energy saving mode, CPU 15 supplies the fan control signal that causes fans $41_1$ to $41_n$ to drive at the number of rotations that has been preset (for example, 3970 rpm) to fan control section 22.

In the regular mode, CPU 15 supplies the fan control signal that causes fan $41_n$ to drive at the number of rotations corresponding to the first setup value (for example, 3970 rpm) to fan control section 22.

In the 75% lighting mode, CPU 15 supplies the fan control signal that causes fan $41_n$ to drive at the number of rotations corresponding to the second setup value (for example, 1866 rpm) to fan control section 22. According to the first embodiment, the second setup value is, for example, 1920 rpm. In contrast, according to the second embodiment, while the device is operating in the automatic energy saving mode, since the air intake fan and air exhaust fan rotate, for example, at 3970 rpm so as to cool lamp 31, the second setup value is set at less than 1920 rpm. In this embodiment, if the second setup value is set to 1920 rpm, as in the first embodiment, lamp 31 might be excessively cooled.

When the 75% lighting mode is switched to the regular mode, CPU 15 supplies the lamp control signal that causes the output of lamp power supply 30 to increase to the first power value (maximum power value) at a constant rate to lamp control section 21 and supplies the fan control signal that causes fan $41_n$ to drive at the number of rotations corresponding to the power value of lamp power supply 30 with reference to the first table to fan control section 22.

When the regular mode is switched to the 75% lighting mode, CPU 15 supplies the lamp control signal that causes the output of lamp power supply 30 to decrease to the second power value (75%) at a constant rate to lamp control section 21 and supplies the fan control signal that causes fan $41_n$ to drive at the number of rotations corresponding to the power value of lamp power supply 30 with reference to the second table.

In the automatic energy saving mode, if image determination section 12a determines that the image signal represents a bright image, CPU 15 increases the output of lamp power supply 30 to the first power value (maximum power). When the output of lamp power supply 30 becomes the first power value (maximum power), CPU 15 supplies the mode switch signal that denotes that the 75% lighting mode has been switched to the regular mode to image processing section 12. When image processing section 12 receives the mode switch signal from CPU 15, image processing section 12 decreases the amplitude of the image signal that is output from input section 14 to the first amplitude value.

If image processing section 12 determines that the image signal represents a dark image, CPU 15 decreases the output of lamp power supply 30 to the second power value (75%). When the output of lamp power supply 30 becomes the second power value (75%), CPU 15 supplies the mode switch signal that denotes that the regular mode has been switched to the 75% lighting mode to image processing section 12. When image processing section 12 receives the mode switch signal from CPU 15, image processing section 12 increases the amplitude of the image signal that is output from input section 14 to the second amplitude value. In this example, the second amplitude value is greater than the first amplitude value.

After the foregoing amplitude control is performed such that the regular mode is switched to the 75% lighting mode, the amplitude of the image signal increases and thereby the contrast increases. On the other hand, after the amplitude control is performed such that the 75% lighting mode is switched to the regular mode, the amplitude of the image signal decrease and thereby the contrast decreases.

Next, the operation of the lamp/fan controls that the image display device according to this embodiment performs will be specifically described.

The lamp/fan controls that are performed according to this embodiment are basically the same as the foregoing procedure shown in FIG. 2.

First, CPU 15 determines whether or not it has accepted a command signal that represents the designation of the automatic energy saving mode from input section 14.

When CPU 15 accepts the command signal that represents the designation of the automatic energy saving mode from input section 14, CPU 15 activates image determination section 12a and supplies the fan control signal that causes fans $41_1$ to $41_{n-1}$ to drive at the number of rotations that has been preset (for example, 3970 rpm) to fan control section 22. Thus, image determination section 12a starts determining the image and causes fans $41_1$ to $41_{1-n}$ to drive at a constant speed of 3970 rpm.

Next, CPU 15 receives the determined result that denotes whether the image signal represents a dark image or a bright image from image determination section 12a.

If CPU 15 receives the determined result that denotes that the image signal represents a bright image from image determination section 12a, CPU 15 supplies the lamp control signal that causes the output of lamp power supply 30 to increase to the first power value (maximum power value) at a constant rate to lamp control section 21 and supplies the fan control signal that causes fan $41_n$ to drive at the number of rotations corresponding to the power value of lamp power supply 30 with reference to the first table. Thereafter, the mode is switched to the regular mode.

If CPU 15 receives the determined result that denotes that the image signal represents a dark image from image determination section 12a, CPU 15 supplies the lamp control signal that causes the output of lamp power supply 30 to decrease to the second power value (75%) at a constant rate to lamp control section 21 and supplies the fan control signal that causes fan $41_n$ to drive at the number of rotations corresponding to the power value of lamp power supply 30 with reference to the second table. Thereafter, the mode is switched to the 75% lighting mode.

Next, CPU 15 determines whether or not it has accepted the command signal that represents the cancellation of the automatic energy saving mode from input section 14.

When CPU 15 accepts the command signal that represents the cancellation of the automatic energy saving mode from input section 14, CPU 15 stops image determination section 12a and supplies the fan control signal that causes fans $41_1$ to $41_{n-1}$ to stop to fan control section 22. Thereafter, CPU 15 supplies the fan control signal that causes fans $41_1$ to $41_{n-1}$ to drive at the number of rotations corresponding to the command signal that is output from input section 14 to fan control section 22.

The foregoing lamp/fan controls can provide the same effects as the first embodiment.

Next, specific effects of the present invention will be described with reference to a comparative example.

Figure 4:
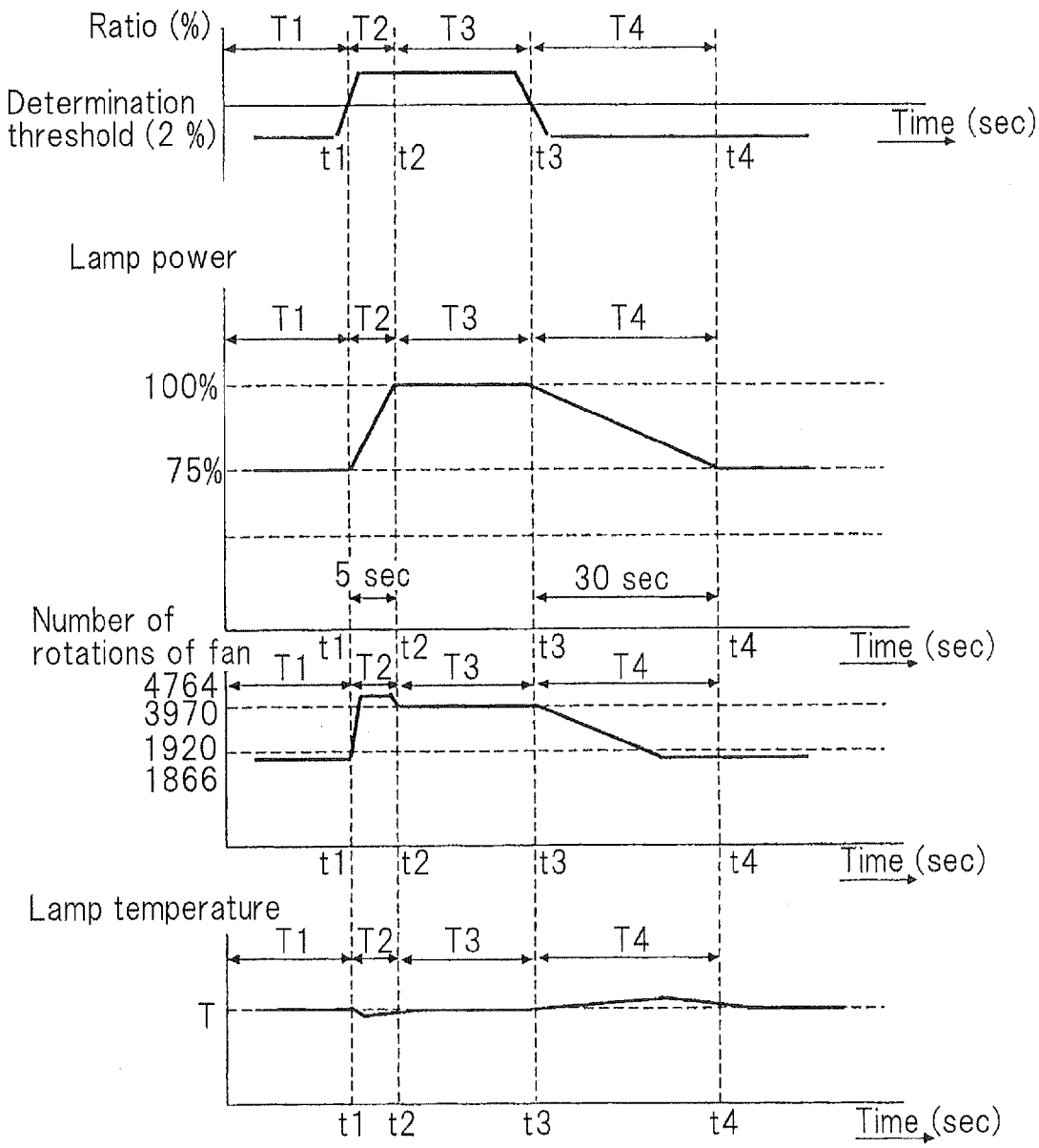
FIG. 4 is a schematic diagram describing the timings of a lamp power control and a fan rotation control that the image display device shown in FIG. 3 performs and the changes of the temperature of the lamp based on these controls.

FIG. 4 is a schematic diagram describing the timings of a lamp power control and a fan rotation control that the image display device performs according to this embodiment and the changes of the temperature of the lamp based on these controls. In FIG. 4, a graph of image determination timing, a graph of lamp power control timing, a graph of fan rotation control timing, and a graph of changes of temperature of lamp are successively shown. The graph of image determination timing shows a waveform in a nearly square shape for simple description not for real.

The 75% lighting mode arises in period T1 until time t1. In this period, the output of lamp power supply 30 is 75% of the maximum power and the number of rotations of fan $41_n$ is 1866 rpm.

If image determination section 12a detects that the ratio of the high gradation level portions of the histogram created from the image signal exceeds the threshold at time t1, the output of lamp power supply 30 increases from 75% to 100% at a constant rate in period T2 after time t1 until time t2. Period T2 is, for example, 5 seconds.

The fan control is performed with reference to the first table in period T2. In this fan control, the number of rotations of fan $41_n$ increases from 1866 rpm to 4764 rpm at a constant rate. After the number of rotations of fan $41_n$ is maintained at 4764 rpm for a particular period, the number of rotations of fan $41_n$ decreases to 3970 rpm at a constant rate.

Image determination section 12a detects that the ratio of the high gradation level portions of the histogram created from the image signal is equal to or less than the threshold at time t3.

The regular mode arises in period T3 after time t2 until time t3. In this period, the output of lamp power supply 30 is 100% and the number of rotations of fan $41_n$ is 3970 rpm.

The output of lamp power supply 30 decreases from 100% to 75% at a constant rate in period T4 after time t3 until time t4. Period T4 is, for example, 30 seconds.

The fan control is performed with reference to the second table in period T4. In this fan control, the number of rotations of fan $41_n$ decreases from 3970 rpm to 1866 rpm at a constant rate and then the number of rotations of fan $41_n$ is maintained at 1866 rpm.

The temperature of lamp 31 is maintained at optimum temperature T until time t1. The temperature of lamp 31 gradually becomes lower after time t1 and then rises. The temperature of lamp 31 becomes optimum temperature T at a particular time in period T3. The temperature of lamp 31 becomes slightly lower after time t1.

The temperature of lamp 31 gradually rises after time t3 and gradually becomes lower after a particular time in period T4. The temperature of lamp 31 becomes optimum temperature T after time t4. The temperature of lamp 31 slightly rises after time t3.

Thus, when the mode is switched between the regular mode and the 75% lighting mode, the temperature of lamp 31 is maintained nearly at optimum temperature T. Thus, explosion of the glass tube, deterioration of permeability, and photo-darkening phenomenon will not occur.

Figure 5:
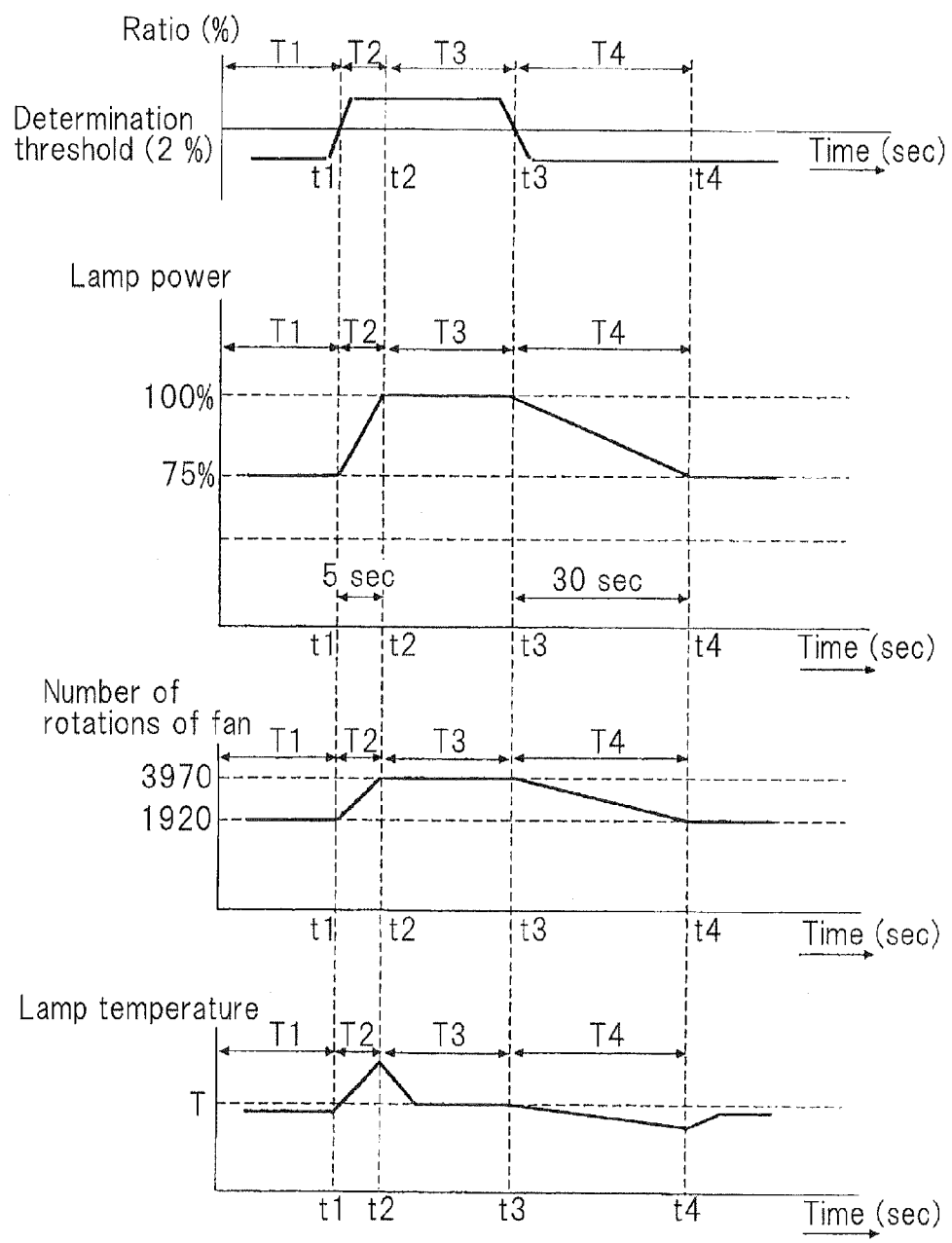
FIG. 5 is a schematic diagram describing the timings of a lamp power control and a fan rotation control that an image display device performs according to a comparative example and the changes of the temperature of the lamp based on these controls.

FIG. 5 is a schematic diagram describing the timings of a lamp power control and a fan rotation control that an image display device performs according to a comparative example and the changes of the temperature of the lamp based on these controls. In FIG. 5, a graph of image determination timing, a graph of lamp power control, a graph of fan rotation control timing, and a graph of changes of temperature of lamp are successively shown. The graph of image determination timing and the graph of lamp power control timing are the same as those shown in FIG. 4.

In the comparative example, fan control is performed with reference to one table that represents the relationship between the power value ranging from 75% to 100% and the number of rotations of the fan ranging from 1920 rpm to 3970 rpm according to the switched mode.

Specifically, when the 75% lighting mode is switched to the regular mode, the output of lamp power supply 30 is increased in the range from 75% to 100% at a constant rate and the rotation of fan $41_n$ is controlled with reference to the table such that the number of rotations of fan $41_n$ becomes the number of rotations corresponding to the power value. In contrast, when the regular mode is switched to the 75% lighting mode, the output of lamp power supply 30 is decreased in the range from 75% to 100% at a constant rate and the rotation of fan $41_n$ is controlled with reference to the table such that the number of rotations of fan $41_n$ becomes the number of rotations corresponding to the power value.

Referring to FIG. 5, the number of rotations of the fan increases from 1920 rpm at a constant rate after time t2 and becomes 3970 rpm at time t3. Period after time t2 until time t3 is 5 seconds.

The number of rotations of fan $41_n$ is maintained at 3970 rpm in period T3 after time t2 until time t3.

The number of rotations of fan $41_n$ decreases from 3970 rpm at a constant rate after time t3 and becomes 1920 rpm at time t4. Period T4 after time t3 until time t4 is 30 seconds.

The number of rotations of fan $41_n$ is maintained at 1920 rpm at and after time t4.

The temperature of lamp 31 is maintained nearly at optimum temperature T until time t1. The temperature of lamp 31 suddenly rises after time t1 until time t2. The temperature of lamp 31 suddenly becomes lower at time t2 and becomes optimum temperature at a particular time in period T3. Thereafter, the temperature of lamp 31 is maintained at optimum temperature T until time t3.

The temperature of lamp 31 suddenly becomes lower after time t3 until time t4. The temperature of lamp 31 suddenly rises after time t4 and the temperature of lamp 31 is maintained nearly at optimum temperature T after a particular time.

In the comparative example, the temperature of lamp 31 suddenly changes upon the mode switching between the regular mode and the 75% lighting mode. Thus, explosion of glass tube, deterioration of permeability, and photo-darkening phenomenon may occur.

In contrast, the image display device according to this embodiment performs the fan control with reference to one of the tables depending on whether the 75% lighting mode is switched to the regular mode or vice versa. According to this embodiment, the fan control can be performed in different manners depending on whether power increases or decrease. For example, as shown in FIG. 4, the fan control can be performed in such a manner that before the output of lamp power supply 30 becomes 100% in period T2, the number of rotations of the fan is quickly increased to 4764 rpm and then decreased to 3970 rpm. In addition, fan control can be performed in such a manner that before the output of lamp power supply 30 becomes 75%, the number of rotations of the fan is quickly decreased to 1866 rpm. This fan control allows the temperature of lamp 31 to be maintained nearly at optimum temperature T according to the switched mode.

In the image display device according to this embodiment, image processing section 12 controls (increases or decreases) the amplitude of the image according to the switched mode. Thus, in the 75% lighting mode where the amplitude of the image signal is increased, if it is detected that the ratio of the high gradation level portions of the histogram exceeds the threshold, since the white level side of the image is saturated, it is necessary to increase the output of lamp power supply 30 so as to decrease the amplitude of the image signal as soon as possible.

According to this embodiment, considering the foregoing, first and second lamp/fan controls are executed as follows.

Figure 6:
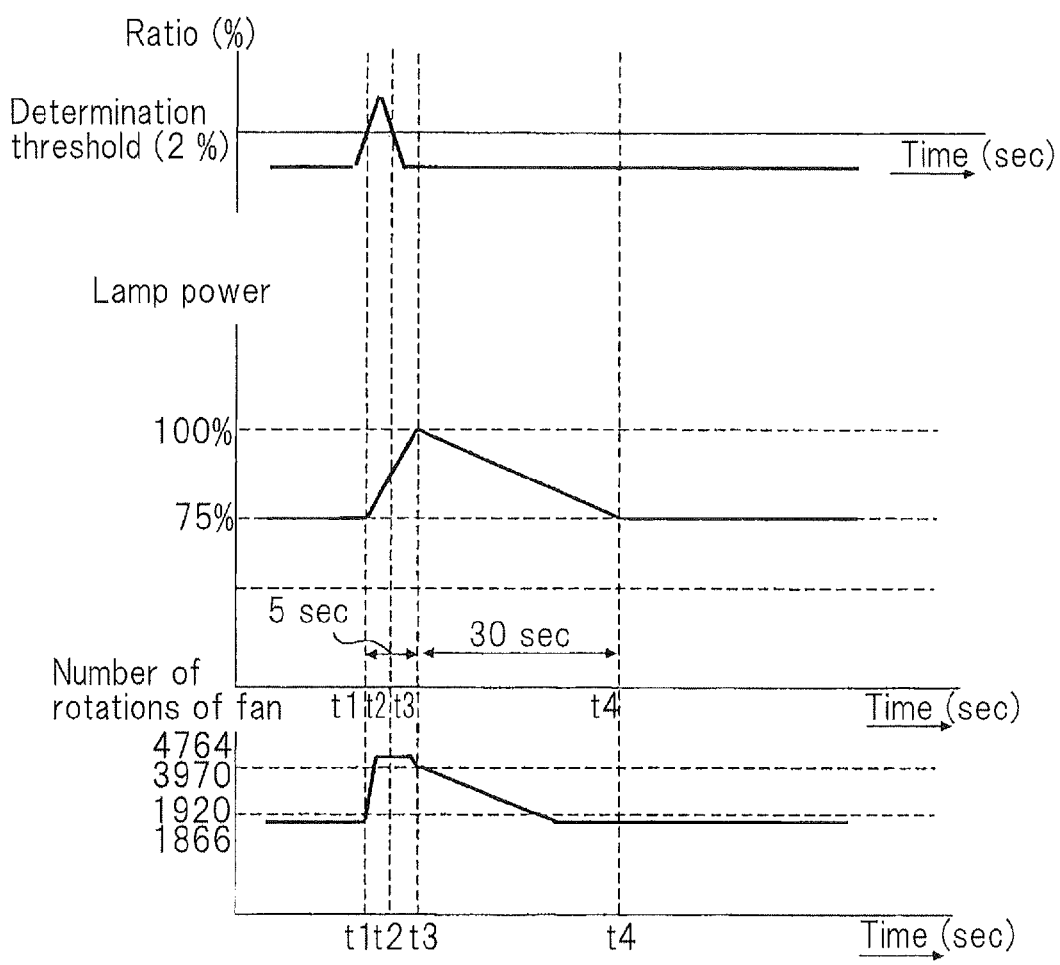
FIG. 6 is a schematic diagram describing first lamp/fan controls that the image display device shown in FIG. 3 performs.

FIG. 6 is a schematic diagram describing first lamp/fan controls. In FIG. 6, a graph of image determination timing, a graph of lamp power control timing, and a graph of fan rotation control timing are successively shown. The graph of image determination timing shows a waveform in a nearly square shape that is just for illustration purposes—this shape does not actually exist.

Referring to FIG. 6, the 75% lighting mode arises in the period until time t1. In this period, the output of lamp power supply 30 is 75% of the maximum power and the number of rotations of fan $41_n$ is 1866 rpm. The amplitude of the image signal is the second amplitude.

If image determination section 12a detects that the ratio of the high gradation level portions of the histogram exceeds the threshold at time t1, the output of lamp power supply 30 increases at a constant rate.

Before the output of lamp power supply 30 becomes 100%, although image determination section 12a detects that the ratio of the high gradation level portions of the histogram is equal to or less than the threshold at time t2, the output of lamp power supply 30 increases at a constant rate and becomes 100% at time t3.

When the output of lamp power supply 30 becomes 100% at time t3, the amplitude of the image signal decreases to the first amplitude value.

The fan control is performed with reference to the first table in the period after time t1 until time t2. In this fan control, the number of rotations of fan $41_n$ increases from 1866 pm to 4764 rpm at a constant rate. After the number of rotations of fan $41_n$ is maintained at 4764 rpm for a particular period, the number of rotations of fan $41_n$ decreases to 3970 rpm at a constant rate.

The output of lamp power supply 30 decreases from 100% to 75% at a constant rate in the period after time t3 until time t4 (30 seconds). In addition, the fan control is performed with reference to the second table in this period. In this fan control, the number of rotations of fan $41_n$ decreases from 3970 rpm to 1866 rpm at a constant rate and then the number of rotations of fan $41_n$ is maintained at 1866 rpm.

When the output of lamp power supply 30 becomes 75% of the maximum power at time t4, the amplitude of the image signal increases to the second amplitude value.

In the foregoing first lamp/fan controls, when the ratio of the high gradation level portions exceeds the threshold and the 75% lighting mode is switched to the regular mode, before the power of lamp power supply 30 becomes 100%, even if it is detected that the ratio of the high gradation level portions is less than the threshold, the power of lamp power supply 30 increases and becomes 100%. Thereafter, the amplitude of the image signal decreases to the first amplitude value. In other words, while the image display device is operating in the 75% lighting mode, if it is detected that the ratio of the high gradation level portions of the histogram exceeds the threshold, the output of lamp power supply 30 always becomes 100% and the amplitude of the image signal always decreases to the first amplitude value. Thus, saturation of the white level side of the image can be prevented.

Figure 7:
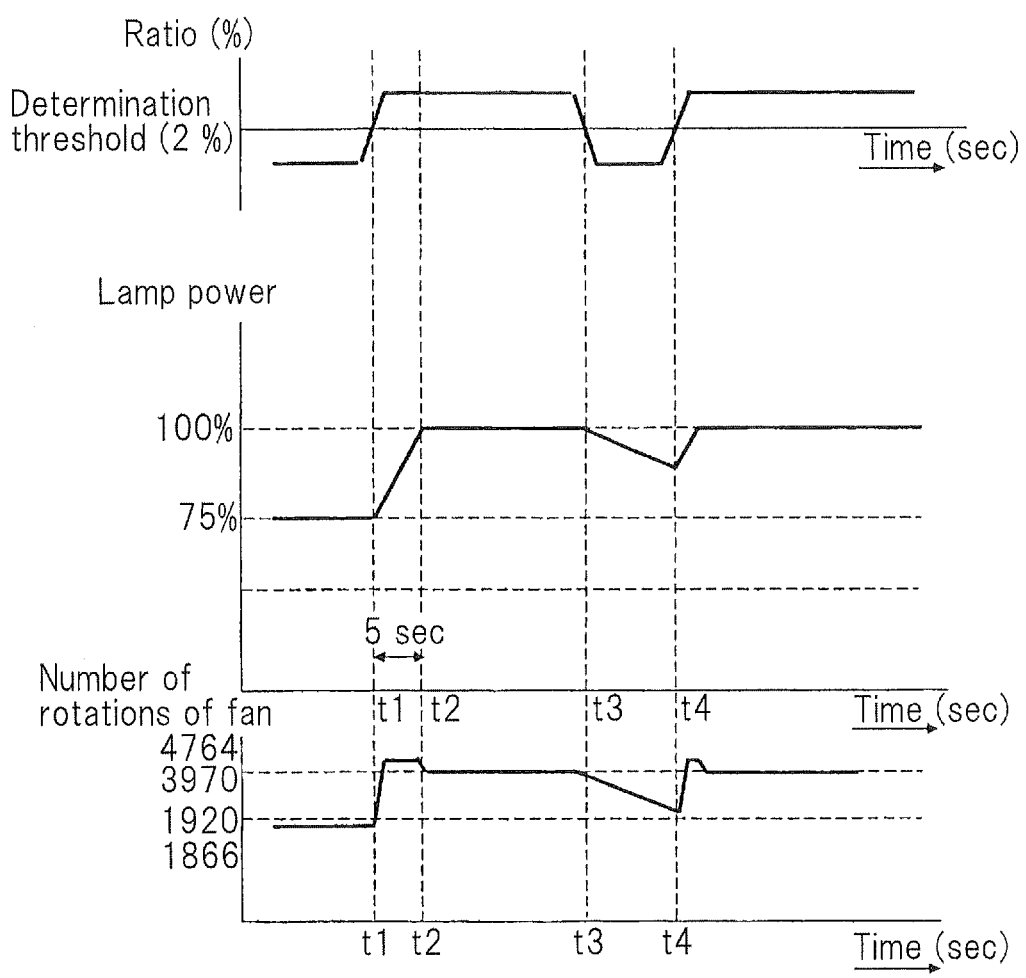
FIG. 7 is a schematic diagram describing second lamp/fan controls that the image display device shown in FIG. 3 performs.

FIG. 7 is a schematic diagram describing the second lamp/fan controls. In FIG. 7, a graph of image determination timing, a graph of lamp power control timing, and a graph of fan rotation control timing are successively shown. The graph of image determination timing shows a waveform in a nearly square shape that is just for illustration purposes—this shape does not actually exist.

Referring to FIG. 7, these controls performed until time t3 are the same as those shown in FIG. 4.

The regular mode arises in period T3 after time t2 until time t3. In this period, the output of lamp power supply 30 is 100% and the number of rotations of fan $41_n$ is 3970 rpm. The amplitude of the image signal is the first amplitude value.

When image determination section 12a detects that the ratio of the high gradation level portions of the histogram is less than the threshold at time t3, the output of lamp power supply 30 decreases at a constant rate.

Before the output of lamp power supply 30 becomes 75% of the maximum power, if image determination section 12a detects that the ratio of the high gradation level portions of the histogram exceeds the threshold at time t4, the output of lamp power supply 30 increases at a constant rate at time t4 and becomes 100% at a particular time.

Fan control is performed with reference to the second table in the period after time t3 until time t4. Fan control is performed with reference to the first table in the period from time t4 until the output of lamp power supply 30 becomes 100%.

In the foregoing second lamp/fan controls, when the ratio of the high gradation level portions becomes less than the threshold and thereby the regular mode is switched to the 75% lighting mode, before the power of lamp power supply 30 becomes 75% of the maximum power, if it is detected that the ratio of the high gradation level portions exceeds the threshold, lamp control is performed such that the power of lamp power supply 30 increases at a constant rate and also fan control is performed with reference to the first table. When the regular mode is switched to the 75% lighting mode, since the amplitude of the image signal has decreased, saturation of the white level side of the image does not occur.

Next, the image determination using a histogram will be described in brief.

FIG. 8 is a schematic diagram exemplifying a histogram of image data having 256 gradation levels. The horizontal axis represents gradation level numbers 0 to 255, whereas the vertical axis represents cumulative brightness values (corresponding to the number of pixels). The luminance values of individual pixels of an image for one frame are allocated to gradation level numbers 0 to 255 so as to obtain a distribution of luminance values as shown in FIG. 8. If the ratio of five gradation level portions of gradation level numbers 251 to 255 and the entire image is equal to or less than the threshold (for example, 2%), it is determined that the image signal represents a bright image. The image determination is performed frame by frame.

With reference to the embodiments, the present invention has been described. However, it should be understood by those skilled in the art that the structure and details of the present invention may be changed in various manners without departing from the scope of the present invention. For example, the image might be determined based on a plurality of thresholds.

The present invention can be applied to image display devices of all types that have a high pressure mercury lamp or the like as a light source and can spatially modulate light emitted from the light source so as to display an image. Specifically, the present invention can be applied to liquid crystal displays and projectors.

The invention claimed is:

1. An image display device that has a light source and that displays an image composed of a plurality of pixels obtained by spatially modulating light emitted from said light source corresponding to an input image signal, said image display device comprising:

a power supply section that supplies power to said light source;

a cooling fan that cools said light source;

a drive section that drives said cooling fan;

an image determination section that determines whether said input image signal represents a bright image or a dark image based on luminance values of the pixels of said image supplied as said input image signal; and a control section that controls said drive section to drive said cooling fan and said power supply section to supply power to said light source, wherein if said image determination section determines that said input image signal represents a bright image, said control section sets up a first lighting mode in which an output of said power supply portion is a first power value and if said image determination section determines that said input image signal represents a dark image, said control section sets up a second lighting mode in which the output of said power supply section is a second power value that is less than said first power value, wherein said control section stores a first table that contains data representing a relationship between the power value of said power supply section and a number of rotations of said cooling fan in a case in which the output of said power supply section is increased from said second power value to said first power value at a constant rate and when said second lighting mode is switched to said first lighting mode, said control section increases the output of said power supply section to said first power value at a constant rate and controls the rotation of said cooling fan corresponding to the power value of said power supply section with reference to said first table, wherein said control section stores a second table that contains data representing the relationship between the power value of said power supply section and the number of rotations of said cooling fan in the case in which the output of said power supply section is decreased from said first power value to said second power value at a constant rate and when said first lighting mode is switched to said second lighting mode, said control section decreases the output of said power supply section to said second power value at a constant rate and controls the rotation of said cooling fan corresponding to the power value of said power supply section with reference to said second table, and wherein said control section stores a first setup value that is set up in said first lighting mode as the number of rotations of said cooling fan and controls the rotation of said cooling fan with reference to said first table such that, before the output of said power supply section becomes said first power value, said control section increases the number of rotations of said cooling fan to the number of rotations that is greater than said first setup value at a constant rate and then decreases the number of rotations of said cooling fan to the number of rotations corresponding to said first setup value, said image display device further comprising:
- an enclosure that accommodates said light source, said drive section, said image determination section, said cooling fan, and said control section;
- a plurality of second fans that are mounted on said enclosure and that brings air in said enclosure and that vent air to the outside; and
- a plurality of second drive sections that drive said plurality of second fans,
  wherein said control section drives said second fans at the number of rotations that is the same as said first setup value through said plurality of second drive sections.

2. The image display device as set forth in claim 1,
wherein said control section stores a second setup value that is set up in said second light mode as the number of rotations of said cooling fan and that is less than said first setup value and controls the rotation of said cooling fan with reference to said second table such that before the output of said power supply section becomes said second power value, said control section decreases the number of rotations of said cooling fan to the number of rotations that is equal to or less than said second setup value at a constant rate.

3. The image display device as set forth in claim 1,
wherein when said second lighting mode is switched to said first lighting mode, before the output of said power supply section becomes said first power value, if said image determination section determines that said input image signal represents a dark image, after the output of said power supply section becomes said first power value, said control section decreases the output of said power supply section to said second power value at a constant rate and controls the rotation of said cooling fan with reference to said second table.

4. The image display device as set forth in claim 2,
wherein when said second lighting mode is switched to said first lighting mode, before the output of said power supply section becomes said first power value, if said image determination section determines that said input image signal represents a dark image, after the output of said power supply section becomes said first power value, said control section decreases the output of said power supply section to said second power value at a constant rate and controls the rotation of said cooling fan with reference to said second table.

5. The image display device as set forth in claims 1,
wherein when said first lighting mode is switched to said second lighting mode, before the output of said power supply section becomes said second power value, if said image determination section determines that said image represents a bright image, said control section increase the output of said power supply section to said first power value at a constant rate and controls the rotation of said cooling fan with reference to said first table.

6. The image display device as set forth in claims 2,
wherein when said first lighting mode is switched to said second lighting mode, before the output of said power supply section becomes said second power value, if said image determination section determines that said image represents a bright image, said control section increase the output of said power supply section to said first power value at a constant rate and controls the rotation of said cooling fan with reference to said first table.

7. The image display device as set forth in claim 1,
wherein said image determination section creates a histogram that represents a distribution of luminance values of individual pixels of said image from said input image signal frame by frame and if a ratio of portions that are equal to or greater than a predetermined luminance value of the histogram and all of said image exceeds a threshold, said image determination section determines that said input image signal represents a bright image and if the ratio is equal to or less than the threshold, said image determination section determines that said input image signal represents a dark image.

8. The image display device as set forth in claim 2,
wherein said image determination section creates a histogram that represents a distribution of luminance values of individual pixels of said image from said input image signal frame by frame and if a ratio of portions that are equal to or greater than a predetermined luminance value of the histogram and all of said image exceeds a threshold, said image determination section determines that said input image signal represents a bright image and if the ratio is equal to or less than the threshold, said image determination section determines that said input image signal represents a dark image.

9. An image display device that has a light source and that displays an image composed of a plurality of pixels obtained by spatially modulating light emitted from said light source corresponding to an input image signal, said image display device comprising:
- a power supply section that supplies power to said light source;
- a cooling fan that cools said light source;
- a drive section that drives said cooling fan;
- an image determination section that determines whether said input image signal represents a bright image or a dark image based on luminance values of the pixels of said image supplied as said input image signal; and
- a control section that controls said drive section to drive said cooling fan and said power supply section to supply power to said light source,
  wherein if said image determination section determines that said input image signal represents a bright image, said control section sets up a first lighting mode in which an output of said power supply portion is a first power value and if said image determination section determines that said input image signal represents a dark image, said control section sets up a second lighting mode in which the output of said power supply section is a second power value that is less than said first power value, wherein said control section stores a first table that contains data representing a relationship between the power value of said power supply section and a number of rotations of said cooling fan in a case in which the output of said power supply section is increased from said second power value to said first power value at a constant rate and when said second lighting mode is switched to said first lighting mode, said control section increases the output of said power supply section to said first power value at a constant rate and controls the rotation of said cooling fan corresponding to the power value of said power supply section with reference to said first table, wherein said control section stores a second table that contains data representing the relationship between the power value of said power supply section and the number of rotations of said cooling fan in the case in which the output of said power supply section is decreased from said first power value to said second power value at a constant rate and when said first lighting mode is switched to said second lighting mode, said control section decreases the output of said power supply section to said second power value at a constant rate and controls the rotation of said cooling fan corresponding to the power value of said power supply section with reference to said second table, and wherein a ratio in which the output of said power supply section is increased to said second power value when said second lighting mode is switched to said first lighting mode is greater than a ratio in which the output of said power supply section is decreased to said first power value when said first lighting mode is switched to said second lighting mode.

10. The image display device as set forth in claim 9, wherein said control section stores a first setup value that is set up in said first lighting mode as the number of rotations of said cooling fan and controls the rotation of said cooling fan with reference to said first table such that before the output of said power supply section becomes said first power value, said control section increases the number of rotations of said cooling fan to the number of rotations that is greater than said first setup value at a constant rate and then decreases the number of rotations of said cooling fan to the number of rotations corresponding to said first setup value.

11. The image display device as set forth in claim 9, wherein said control section stores a second setup value that is set up in said second light mode as the number of rotations of said cooling fan and that is less than said first setup value and controls the rotation of said cooling fan with reference to said second table such that before the output of said power supply section becomes said second power value, said control section decreases the number of rotations of said cooling fan to the number of rotations that is equal to or less than said second setup value at a constant rate.

12. A light source cooling method for an image display device that has a light source, a power supply section that supplies power to said light source, a cooling fan that cools said light source, a drive section that drives said cooling fan, a control section that controls said drive section to drive said cooling fan and said power supply section to supply power to said light source, and further including an enclosure that accommodates said light source, said drive section, said cooling fan, and said control section, said image display device displaying an image composed of a plurality of pixels obtained by spatially modulating light emitted from said light source corresponding to an input image signal, said light source cooling method comprising:

determining whether or not said input image signal represents a bright image or a dark image based on luminance values of the pixels of said image supplied as said input image signal;

switching between a first lighting mode in which an output of said power supply portion is a first power value and a second lighting mode in which the output of said power supply section is a second power value that is less than said first power value;

increasing the output of said power supply section to said first power value at a constant rate and controlling a rotation of said cooling fan corresponding to the power value of said power supply section with reference to a first table that contains data representing a relationship between the power value of said power supply section and a number of rotations of said cooling fan in a case in which the output of said power supply section is increased from said second power value to said first power value at a constant rate when said second lighting mode is switched to said first lighting mode; and decreasing the output of said power supply section to said second power value at a constant rate and controlling the rotation of said cooling fan corresponding to the power value of said power supply section with reference to a second table that contains data representing the relationship between the power value of said power supply section and the number of rotations of said cooling fan in a case in which the output of said power supply section is decreased from said first power value to said second power value at a constant rate when said first lighting mode is switched to said second lighting mode, wherein said control section stores a first setup value that is set up in said first lighting mode as the number of rotations of said cooling fan and controls the number of rotations of said cooling fan with reference to said first table such that before the output of said power supply section becomes said first power value, said control section increases the number of rotations of said cooling fan to the number of rotations that is greater than said first setup value at a constant rate and then decreases the number of rotations of said cooling fan to the number of rotations corresponding to said first setup value, said method further comprising:

bringing air in said enclosure via a plurality of second fans that are mounted on said enclosure;

venting air to an outside via the plurality of second fans; and driving said second fans at the number of rotations that is the same as said first setup value through said plurality of second drive sections.

\* \* \* \* \*